United States Patent Office 3,431,167
Patented Mar. 4, 1969

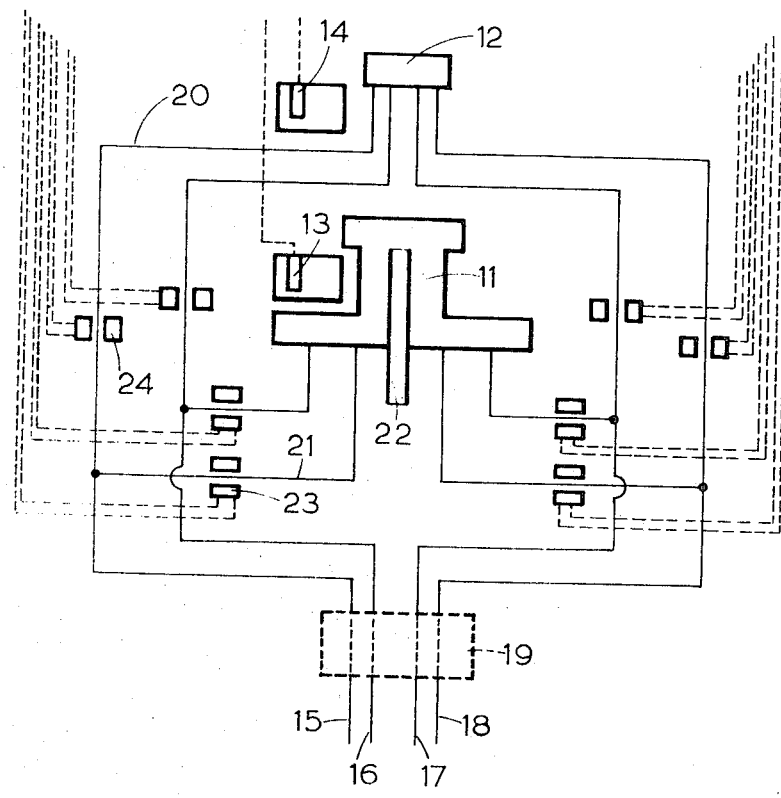

3,431,167
APPARATUS FOR TESTING FOR NUCLEAR FUEL ELEMENT SHEATHING FAILURE
Stanley Hackney, Appleton, near Warrington, and Daniel Fraser Davidson, Eastham, England, assignors to United Kingdom Atomic Energy Authority, London, England
Filed July 5, 1967, Ser. No. 651,219
Claims priority, application Great Britain, July 22, 1966, 33,031/66
U.S. Cl. 176—19                                     6 Claims
Int. Cl. G21c 17/06, 15/00

ABSTRACT OF THE DISCLOSURE

Apparatus for testing for the occurrence of fuel element sheathing failure in a nuclear reactor core cooled by liquid metal employs a chamber at which to detect the presence of fission products by conventional detection means, sampling pipes extending from the vicinity of the fuel elements to said chamber for carrying liquid metal coolant, and selectively operable devices each associated with a sample pipe for altering by means of electromagnetic interaction with liquid metal in the respective pipe the relationship of the flow impedances in the pipe between one promoting flow and one substantially preventing flow. The devices may constitute electromagnetic pumps or electromagnetic brakes. Various alternative configurations of device position and sampling pipe layout are described.

---

The present invention relates in general to the control of liquid metal flow and more particularly is concerned with a valveless liquid metal flow route selector.

The selector of the invention is based on the utilisation of devices which by electromagnetic interaction with the liquid metal can determine whether a particular flow is retarded or promoted. More specifically, such a device is provided on at least one of a plurality of pipe branches and is operable selectively to alter valvelessly the relationship of the branch flow impedances between one promoting flow in a particular branch and another substantially preventing flow in that branch. It will be appreciated that the invention exploits the well-known principle that an electrically conductive material, in this case the liquid metal, moving in a magnetic field experiences an electromotive force; in effect this principle is used to superimpose selectively on the flow impedances existing in a branched system flow retarding or preventing forces which can alter the route taken.

Suitable forms of the above-mentioned devices are the D.C. electromagnetic pump and the electromagnetic brake, the latter consisting simply of a variable field electromagnet capable of exerting a braking action by eddy current effects. By energisation of either such device in the appropriate sense it becomes possible to retard flow in the branch on which the device is provided. Especially where there is only one other branch, the retardation in the one branch will promote flow in the other branch. With a device in the form of a pump flow can be promoted directly by energisation in a sense opposite to that already mentioned.

Flow route selection in this manner is applicable to the control of flows in nuclear reactor plants using liquid metal as a coolant; in particular such application may be for purposes connected with testing for the occurrence of fuel element sheathing failures. This sort of test, often known as "burst cartridge detection" (and hence B.C.D.), may be carried out by sampling the coolant which flows through the core. It is commonly the case that the core has separate channels in which the fuel elements are disposed; sampling pipes are then used to conduct samples from the channel outlets to some form of detector which will indicate the presence of fission products, and hence a fuel element sheathing failure, either by a process involving the precipitation of solid daughter products of fission product gases or by the counting of delayed neutron emission arising from the decay of certain of the fission products. Each sampling pipe corresponds to a particular location in the core, that is to say, a particular channel or group of channels, and therefore if the pipes are monitored individually one can obtain also an indication of where the sheathing failure has occurred. To avoid the provision of a detector for each sampling pipe it is usually sufficient to arrange that a number of pipes are connectable selectively and singly to one common detector.

For testing for the occurrence of fuel element sheathing failures in a nuclear reactor core cooled by liquid metal, the invention accordingly provides the combination comprising a common chamber at which to detect the presence of fission products, inlet branches constituted by sampling pipes leading to the chamber, and associated with each pipe a device which is operable selectively, each independently of the other such devices, for altering by means of electromagnetic interaction with liquid metal in the respective pipe the relationship of the inlet branch flow impedances between one promoting flow in the respective pipe and one substantially preventing flow in that pipe.

Conveniently each sampling pipe is itself branched so that flow can continue, when substantially prevented in the inlet branch, by diversion to another branch; it may be on this other branch that the selectively operable device is provided. If the other branches lead to a second common chamber one can control which chamber the individual sampling pipe flows are routed to.

When two chambers are provided, one may be adapted for bulk detection which implies that normally all sampling pipe flows are routed to this chamber and therefore become mixed in this chamber; the level of fission product activity in any particular sampling pipe flow is measured at the other chamber, the procedure contemplated being that each sampling pipe flow would be routed in turn through this other chamber. With two chambers, only one need have an outlet; the other can accept a single flow and return it through the nonoperative inlet branches. This arrangement is included in the particular example of the invention which is represented by the circuit diagram constituting the sole figure of the accompanying drawing and this example will now be described in order to illustrate features of practical application of the invention.

The two chambers are indicated 11 and 12, chamber 11 being a bulk chamber and chamber 12 a location chamber; respective detectors represented by delayed neutron counters, such as those known as $BF_3$ counters, are indicated at 13 and 14.

Four sampling pipes representative of a large number are indicated 15, 16, 17 and 18. It is to be understood that these pipes run respectively to the fuel-containing channels of a reactor core cooled by a liquid metal which is assumed in this example to be sodium. Since little pressurisation of the coolant is called for, there may be insufficient head to obtain the requisite flow through the sampling pipes and this flow may therefore have to be pumped. Conveniently a multiduct electromagnetic pump is employed as indicated at 19 in broken outline. Rather than have the ducts of this pump all in one flat bank, they may be divided into several such banks arranged radially between segments which together constitute an annular magnet.

Each sampling pipe is branched to form a location chamber inlet branch 20 and a bulk chamber inlet branch 21. It should be noted that the location chamber inlet branches 20 are best arranged to form a bundle adjacent the location chamber so that the detector 14 can be operative more on the flows in the branch bundle than on the contents of the chamber itself. Preferably the location chamber serves more as a common connecting point or manifold than as a holder. Only the bulk chamber 11 has an outlet, this being indicated 22. Therefore, assuming equal flow impedances in all the branches, the location chamber inlet branches 20 will be in a state of balance so that all flow will proceed through the bulk chamber inlet branches 21 to the bulk 11 where the outlet to a low pressure is available. To assist in maintaining the balanced state of the location chamber inlet branches against the possibility of some non-uniformity of the flow rates at the take-off points, these inlet branches may be connected in a downstream-facing manner at the take-off points so as to be less sensitive to dynamic pressure head variations. This manner of connection may be achieved sufficiently by using pipe T's into which are fitted plates which effectively angle downstream the direction in which the location chamber inlet branches open into the T's.

Flowmeters 23 are provided respectively on the bulk chamber inlet branches 21 and are conveniently of an electromagnetic type as indicated by the wiring appertaining thereto. An important function of these flowmeters is to enable warning to be obtained of an interruption of flow in any one of the sampling pipes.

To enable flow to be diverted to the location chamber, each location chamber inlet branch is provided with a D.C. electromagnetic pump device 24. If one of these devices is energised in the sense appropriate for pumping towards the location chamber, the balanced state of the location chamber inlet branches is disturbed and the branch corresponding to the energised device will divert the flow in the respective sampling pipe to the location chamber. From the location chamber this flow will return to the bulk chamber through the location chamber inlet branches on which the devices remain deenergised. The degree of pumping necessary for maximum diversion may call for close control of the electrical supply of the device 24 and a feedback control using a signal from the associated flowmeter 23 may be employed.

As an alternative, the devices previously referred to as flowmeters 23 may be electromagnetic brakes. When such a brake is energised the same effect is achieved of diverting the flow of the corresponding sampling pipe to the location chamber. The brake device may be adapted to serve as a flowmeter as well. To this end, the customary construction of electromagnetic flowmeter can be modified to increase the induced currents, and hence the braking effect, for example, by reducing the resistance of the pipe wall with which it cooperates; this may be achieved by copper plating on the outside of a pipe which otherwise is of, say, stainless steel. The braking characteristic of such a dual purpose device is linear, that is to say, pressure drop is proportional to flow, and it is also proportional to the square of the field strength. Against this the sensitivity as a flowmeter is only directly proportional to field strength and therefore it is possible to indicate flow in both the braked and the unbraked condition if a small residual field is maintained in the latter. Flow indication obtainable in this way may be used to assess efficiency of diversion. To provide more accurate flow measurement the devices 24 in the drawing may be retained in the role of flowmeters but are preferably repositioned upstream of the branch junctions.

To reduce the number of sampling pipes in the illustrated part of the B.C.D. system, manual selector devices can be used upstream of the pump 19 to connect each of the pipes 15 to 18 to a plurality of sampling pipes coming from individual channels of the core. In this way each of the pipes 15 to 18 would be representative normally of a group of core channels, but by operation of the manual selector devices it would be possible to find which of these channels is the one giving rise to fission products.

We claim:
1. Apparatus for testing for the occurrence of fuel element sheathing failures in a nuclear reactor core cooled by liquid metal, comprising a common chamber at which to detect the presence of fission products, means, disposed adjacent said chamber, for detecting fission products, a second common chamber at which to detect the presence of fission products, second means, disposed adjacent said second chamber, for detecting fission products, a plurality of coolant sampling pipes extending from said core and each branched so that one branch of each leads to one chamber and the other branch to the other chamber, a device associated with each sampling pipe and operable selectively, independently of the other such devices, for altering by means of electromagnetic interaction with liquid metal coolant in the respective sampling pipe the relationship of the flow impedances in the branches thereof between one promoting flow in a branch and one substantially preventing flow in that branch, and means for selectively operating appropriate said devices for effecting control over which of said chambers said coolant is routed to.

2. Apparatus according to claim 1, wherein one of said chambers constitutes the detection chamber for bulk coolant and the other chamber constitutes the detection chamber for individual coolant samples, and including control means for said means for selectively operating appropriate devices for operating said devices in sequence for effecting individual and successive routing of samples from said sampling pipes to said detection chamber for individual samples and effecting continuous routing of the other samples to said detection chamber for bulk coolant for mixing therein.

3. Apparatus according to claim 2, including an outlet for the bulk detection chamber only, said outlet serving for returning the coolant samples to the bulk coolant of the nuclear reactor, individual samples from said sample pipes and supplied to said individual sample detection chamber being passed from the latter chamber to said bulk detection chamber for return to said bulk reactor coolant via non-operative sampling pipe branches.

4. Apparatus according to claim 1, wherein said devices are electromagnetic pumps.

5. Apparatus according to claim 1, wherein said devices are electromagnetic brakes.

6. Apparatus according to claim 5, wherein said electromagnetic brakes function also as flowmeters.

References Cited

UNITED STATES PATENTS

| | | |
|---|---|---|
| 2,841,545 | 7/1958 | Zinn. |
| 3,032,993 | 5/1962 | Cole. |
| 3,109,929 | 11/1963 | Picard. |
| 3,141,413 | 7/1964 | Heyman. |
| 3,147,711 | 9/1964 | Blake. |
| 3,340,725 | 9/1967 | Wilkinson _____ 73—61 |
| 3,343,401 | 9/1967 | Delisle _____ 73—61 X |

REUBEN EPSTEIN, *Primary Examiner.*

U.S. Cl. X.R.
73—40.5; 340—242